United States Patent
Hubbard et al.

(10) Patent No.: US 12,450,014 B2
(45) Date of Patent: Oct. 21, 2025

(54) PREEMPTIVELY WARNING HOST OF BACKGROUND FOLDING

(71) Applicant: Micron Technology, Inc., Boise, ID (US)

(72) Inventors: Daniel J. Hubbard, Boise, ID (US); Kevin R Brandt, Boise, ID (US); David Ebsen, Minnetonka, MN (US); Sampath Ratnam, San Jose, CA (US); Brent Carl Byron, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/775,754

(22) Filed: Jul. 17, 2024

(65) Prior Publication Data

US 2025/0028483 A1  Jan. 23, 2025

Related U.S. Application Data

(60) Provisional application No. 63/527,717, filed on Jul. 19, 2023.

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0688* (2013.01)

(58) Field of Classification Search
CPC ...... G06F 3/0659; G06F 3/0604; G06F 3/064; G06F 3/0688
See application file for complete search history.

(56) References Cited

U.S. PATENT DOCUMENTS

| | | |
|---|---|---|
| 2018/0143762 A1 | 5/2018 | Kim et al. |
| 2019/0146911 A1 | 5/2019 | Ha et al. |
| 2020/0334145 A1 | 10/2020 | Yoshii et al. |
| 2021/0096772 A1 | 4/2021 | Lee |
| 2021/0216239 A1 | 7/2021 | Dutta et al. |

(Continued)

FOREIGN PATENT DOCUMENTS

| | | |
|---|---|---|
| KR | 102053865 | 12/2019 |
| KR | 102225525 | 3/2021 |

OTHER PUBLICATIONS

"International Application Serial No. PCT US2024 034616, International Search Report mailed Sep. 30, 2024", 3 pages.

(Continued)

*Primary Examiner* — Eric Cardwell
(74) *Attorney, Agent, or Firm* — Schwegman Lundberg & Woessner, P.A.

(57) ABSTRACT

Aspects of the present disclosure configure a memory subsystem controller to allow a host to deallocate data prior to folding operations. The controller generates an instruction to fold data stored in an individual portion of the set of memory components. The controller, prior to executing the instruction to fold the data stored in the individual portion of the set of memory components, transmits a communication to a host indicative of the instruction to fold the data stored in the individual portion. The controller conditions execution of the instruction to fold the data stored in the individual portion of the set of memory components based on transmission of the communication to the host.

20 Claims, 7 Drawing Sheets

(56) References Cited

U.S. PATENT DOCUMENTS

| | | | |
|---|---|---|---|
| 2022/0050627 A1* | 2/2022 | Pratt | .................... G06F 3/0659 |
| 2022/0114092 A1 | 4/2022 | Lengauer | |
| 2022/0147392 A1 | 5/2022 | Choi et al. | |
| 2023/0161697 A1 | 5/2023 | Kale et al. | |
| 2025/0007918 A1* | 1/2025 | Helmick | ............... H04L 63/105 |

OTHER PUBLICATIONS

"International Application Serial No. PCT US2024 034616, Written Opinion mailed Sep. 30, 2024", 3 pages.
"International Application Serial No. PCT US2024 038348, International Search Report mailed Oct. 24, 2024", 3 pages.
"International Application Serial No. PCT US2024 038348, Written Opinion mailed Oct. 24, 2024", 3 pages.
U.S. Appl. No. 18/747,582, filed Jun. 19, 2024, Balancing Wear Across Multiple Reclaim Groups.

* cited by examiner

PREEMPTIVELY WARNING HOST OF BACKGROUND FOLDING

PRIORITY APPLICATION

This application claims the benefit of priority to U.S. Provisional Application Ser. No. 63/527,717, filed Jul. 19, 2023, which is incorporated herein by reference in its entirety.

TECHNICAL FIELD

Examples of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components. Some memory sub-systems arrange their memory components into reclaim groups (RGs), each of which includes sets of reclaim units (RUs). Such memory sub-systems enable a host to control the physical location (e.g., by RG and/or RU via an RU handle) into which data is programmed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
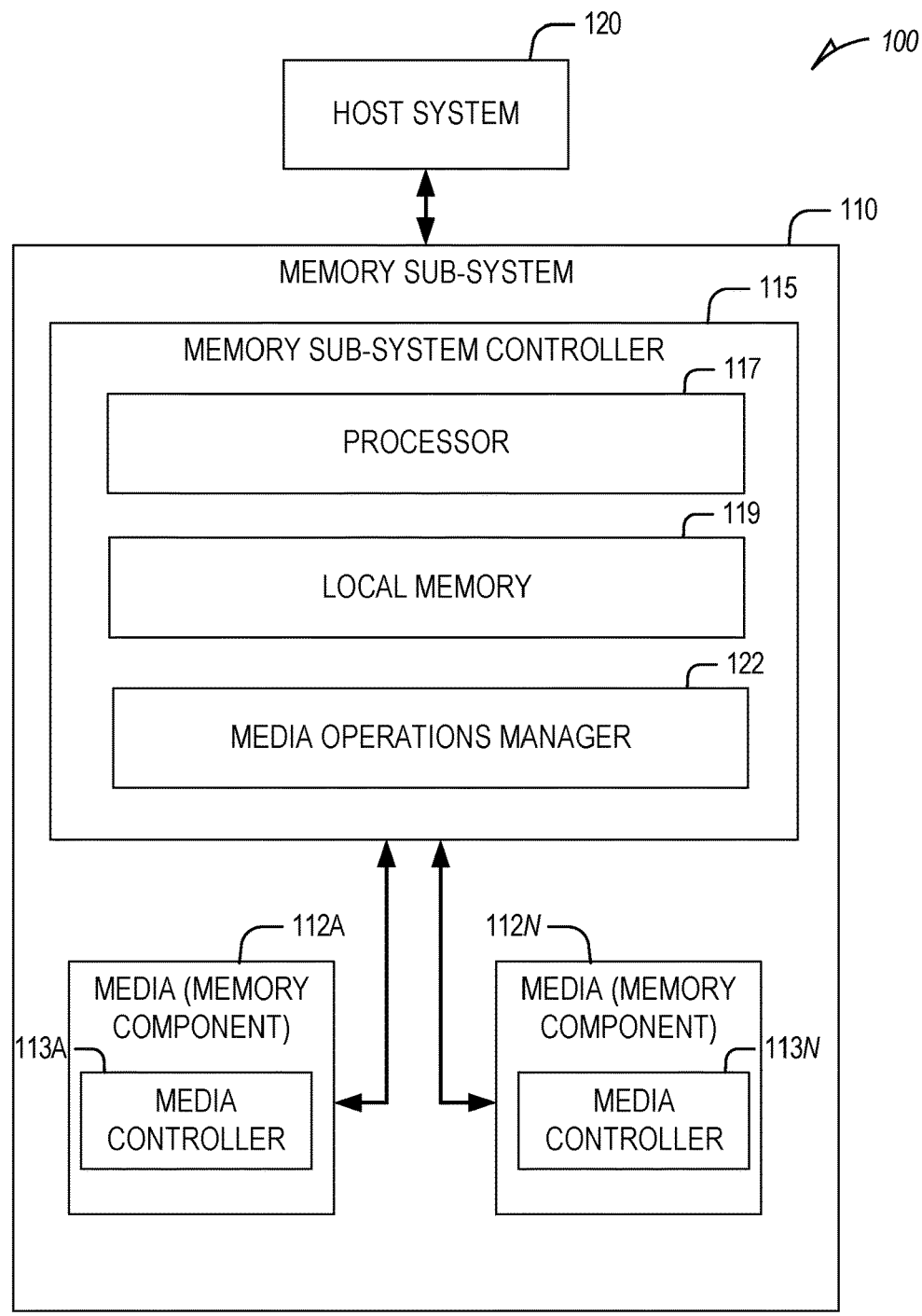
FIG. 1 is a block diagram illustrating an example computing environment including a memory sub-system, in accordance with some embodiments of the present disclosure.

Aspects of the present disclosure configure a system component, such as a memory sub-system controller, to perform folding (garbage collection) operations in coordination and/or participation by a host. The memory sub-system controller can identify one or more memory components in which data is stored that needs to be folded. The memory sub-system controller can delay folding of the data stored in the one or more memory components to allow a host to participate and selectively deallocate the data stored in the one or more memory components. If the host deallocates (invalidates) the data, the memory sub-system controller prevents folding the data. If the host fails to deallocate the data before expiration of a timer and/or event, the memory sub-system controller automatically folds the data stored in the one or more memory components. In some cases, these memory components can be part of a RG and can be folded in accordance with RG and RU folding operations. This ensures that performance of the memory system remains optimal by reducing write amplitude in cases where the host deallocates the data prior to the memory sub-system controller performing folding operations. This improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data". In some cases, the memory sub-system includes an optional feature, such as a Flexible Data Placement (FDP) feature that defines RGs and RUs. This protocol enables remote hosts to control data storage on the memory sub-systems.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation.

If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Certain memory systems group the physical memory components into different RGs where each RG includes multiple RUs. The RUs can be of any size that is at least as large as the LUN. Namely, the RU can be the size of a single block or can be the size of a superblock spanning multiple memory dies. These memory systems allow hosts to store data to certain RG and/or to certain RUs within those RGs using corresponding RU handles (write pointers). This provides greater control to the host as to where data is physically stored. Once data is stored to an individual RG, garbage collection operations can be performed but are limited to folding data using the RUs of the individual RG. Namely, data cannot be folded into any RU or another RG but all remains stored in the same RG.

While allowing host devices to control where data is physically stored provides additional flexibility, such processes also introduce inefficiencies in data storage. For example, the need to perform garbage collection operations within the same RG can increase the write amplitude of the memory sub-system. Also, in some cases, data that is stale and no longer needed can be folded in the RG, which unnecessarily increases the write amplitude and wastes resources. Because the memory sub-system controller is unaware of which data is important and which is not, the memory sub-system controller treats all data with the same level of importance and performs folding operations as needed without involving the host. This can degrade the memory performance and efficiency by increasing the write amplitude.

Aspects of the present disclosure address the above and other deficiencies by providing a memory controller that can coordinate with a host as to which data needs to be folded. Namely, the memory controller can delay folding data until expiration of a timer and/or event and informs the host about possible folding operations being performed for the data stored in certain memory components (e.g., logical block addresses (LBAs), RGs, and/or RUs). The host can analyze the data and selectively deallocate the data or invalidate the data to prevent the memory controller from executing garbage collection or folding operations on that data. This reduces the write amplitude, which improves the overall efficiency of operating the memory sub-system.

In some examples, the memory controller generates an instruction to fold data stored in an individual portion of the set of memory components. The memory controller, prior to executing the instruction to fold the data stored in the individual portion of the set of memory components, transmits a communication to a host indicative of the instruction to fold the data stored in the individual portion. The memory controller conditions execution of the instruction to fold the data stored in the individual portion of the set of memory components based on transmission of the communication to the host.

In some examples, the memory sub-system includes FDP. In some cases, the memory controller groups the set of memory components into a plurality of RGs. Each RG of the plurality of RGs can include a subset of RUs. The individual portion can include an individual RU of the subset of RUs of an individual RG. In some examples, the memory controller initializes a timer in response to transmitting the communication to the host. The memory controller determines that the timer has reached a threshold value prior to receiving an instruction from the host in association with the individual portion. The memory controller automatically folds the data stored in the individual portion of the set of memory components in response to determining that the timer has reached the threshold value prior to receiving the instruction from the host in association with the individual portion.

In some examples, the memory controller prevents folding the data stored in the individual portion in response to receiving the instruction from the host prior to the timer reaching the threshold value. In some examples, the instruction includes a request to deallocate or invalidate the data stored in the individual portion. In some examples, the timer is configurable.

In some examples, the memory controller receives an instruction from the host to deallocate or invalidate the data stored in the individual portion. The memory controller prevents folding the data stored in the individual portion in response to receiving the instruction from the host. In some examples, the memory controller identifies one or more LBAs associated with the data stored in the individual portion and provides the identified one or more LBAs to the host in the communication.

In some examples, the host identifies a plurality of LBAs that include the one or more LBAs and an additional set of adjacent LBAs. The host generates an instruction to deallocate or invalidate data stored in the plurality of LBAs. In some examples, the communication is transmitted to the host asynchronously and in response to generating the instruction to fold data stored in an individual portion.

In some examples, the communication is stored in a log file on the memory sub-system. The memory controller receives a request from the host to read the log file and retrieves the communication for transmission to the host in response to receiving the request from the host to read the log file. In some examples, the memory controller folds the data stored in the individual RU to another RU of the individual RG. In some examples, the communication identifies the individual RU of the subset of RUs. In some cases, the instruction to fold the data is generated in response to determining that the individual portion satisfies one or more folding criteria. In some cases, the one or more folding criteria includes at least one of low free block count, static wear leveling, read disturb, or error handling.

Though various examples are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed.

In some examples, one of the memory components 112A to 112N can be associated with a first RG and another one of the memory components 112A to 112N can be associated with a second RG. In some cases, a first portion of the memory components 112A to 112N can be associated with a first RU of the first RG and a second portion of the memory components 112A to 112N can be associated with a second RU of the second RG. The memory sub-system 110 can have any number of RGs and any number of RUs within each RG and can, in some cases, implement the FDP.

In some examples, the first memory component 112A, block, or page of the first memory component 112A, or group of memory components including the first memory component 112A can be associated with a first reliability (capability) grade, value, measure, or lifetime PEC. The terms "reliability grade," "value" and "measure" are used interchangeably throughout and can have the same meaning. The second memory component 112N or group of memory components including the second memory component 112N can be associated with a second reliability (capability) grade, value, measure, or lifetime PEC. In some examples, each memory component 112A to 112N can store respective configuration data that specifies the respective reliability grade and lifetime PEC and current PEC. In some examples, a memory or register can be associated with all of the memory components 112A to 112N and can store a table that maps different groups, bins or sets of the memory components 112A to 112N to respective reliability grades, lifetime PEC values, and/or current PEC values.

In some examples, a memory or register can be associated with all of the memory components 112A to 112N and can store a table that maps portions of the memory components 112A to 112N to different groups of RG. The table can specify which set of memory components 112A to 112N maps to or is associated with and grouped with a first RG and, within that set, which portions of the memory components 112A to 112N correspond to RUs within the first RG. The table can also store an indication and keep track of the number of PEC of the first RG. Similarly, the table can specify which other set of memory components 112A to 112N maps to, or is associated with, and grouped with a second RG, and within that set, which portions of the memory components 112A to 112N correspond to RUs within the second RG. In some cases, the table stores a list of LBAs associated with each RU.

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, garbage collection operations, different near miss ECC operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the lifetime PEC values and/or reliability grades associated with different groups of the memory components 112N to 112N and/or different blocks within each of the memory components 112N to 112N. In some examples, commands or operations received from the host system 120 can include a write command which can specify or identify an individual RG and/or RU within the individual RG to which to program data. Based on the individual RG specified by the write command, the memory sub-system controller 115 can determine the memory components 112A to 112N associated with the individual RG and can generate a write pointer that is used to program the data to the determined memory components 112A to 112N. In some cases, the host system 120 can select an individual RU handle and can program data using the selected individual RU handle. Any data that is written by the host system 120 using the individual RU handle can be stored to a specified RU that is associated with the RU handle. Based on which RU handle is used by the host system 120 to program data, different RUs are used by the host system 120 to physically store the data. In some cases, the host system 120 can track which LBAs are associated with which RU handles and can determine, based on the LBAs, the RUs in which the data is stored.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to coordinate with the host system 120 as to which data needs to be folded. Namely, the media operations manager 122 can delay folding data (or performing other media management operations) until expiration of a timer and/or event and informs the host system 120 about possible folding operations being performed for the data stored in certain memory components (e.g., logical block addresses (LBAs), RGs, and/or RUs). The host system 120 can analyze the data and selectively deallocate the data or invalidate the data to prevent the media operations manager 122 from executing media management operations, such as garbage collection or folding operations, on that data. This reduces the write amplitude which improves the overall efficiency of operating the memory sub-system 110.

Depending on the example, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
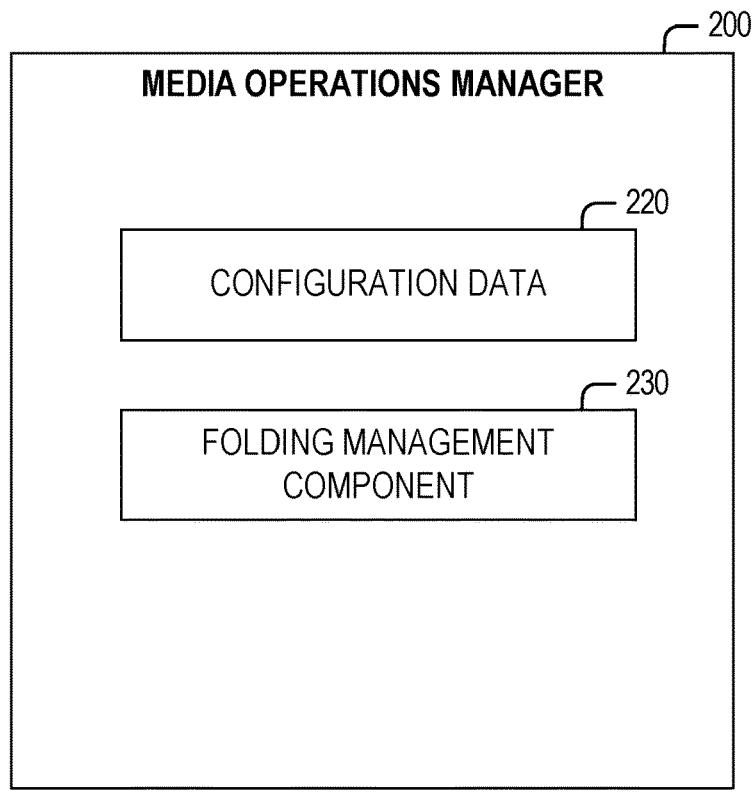
FIG. 2 is a block diagram of an example media operations manager, in accordance with some implementations of the present disclosure.

FIG. 2 is a block diagram of an example media operations manager 200 (corresponding to media operations manager 122), in accordance with some implementations of the present disclosure. As illustrated, the media operations manager 200 includes configuration data 220 and a folding management component 230. For some examples, the media operations manager 200 can differ in components or arrangement (e.g., less or more components) from what is illustrated in FIG. 2.

The configuration data 220 accesses and/or stores configuration data associated with the memory components 112A to 112N. In some examples, the configuration data 220 is programmed into the media operations manager 200. For example, the media operations manager 200 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including configurable timer values that control how much delay is provided by the media operations manager 122 before folding data, events that trigger execution of folding operations, lifetime PEC values of different bins, groups, blocks, block stripes, memory dies and/or sets of the memory components 112A to 112N, and/or group assignments that define the sizes of different RUs and RGs. The media operations manager 122 receives configuration data from the host system 120 and stores the configuration data in the configuration data 220.

The configuration data 220 can store a map that identifies which sets of memory components 112A to 112N are used to implement different RGs. For example, the configuration data 220 can store a map that associates a first RG with a first portion of the memory components 112A to 112N (e.g., a first die or first set of LBAs) and that associates a second RG with a second portion of the memory components 112A to 112N (e.g., a second die or second set of LBAs). Namely, the map can store an indication of the physical addresses or LUN of the first portion of the memory components 112A to 112N associated with the first RG and an indication of the physical addresses or LUN of the second portion of the memory components 112A to 112N associated with the second RG.

Figure 3:
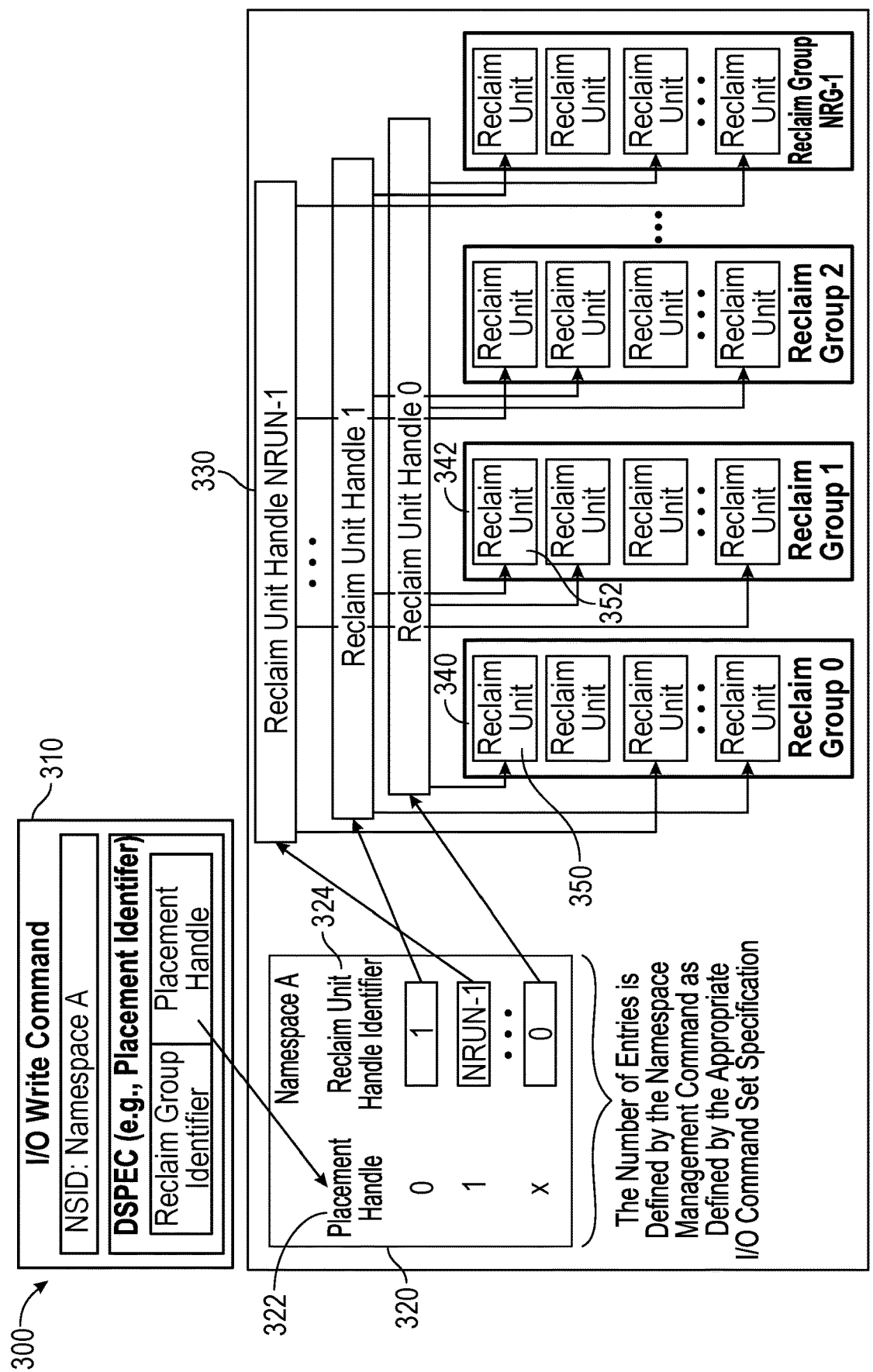
FIG. 3 is a block diagram of an example RG system implementation of the memory sub-system, in accordance with some implementations of the present disclosure.

For example, FIG. 3 is a block diagram of an example RG system 300 implementation of the memory sub-system 110. The RG system 300 includes a placement handle component 320 that is used to store the map of different groups (e.g., the map stored by the configuration data 220). The RG system 300 can receive a write command 310 that specifies at least a RG and/or a placement handle. The placement handle component 320 can search the map using the placement handle 322 to identify the RU 324 associated with the specified RG. The RG system 300 can then generate a write pointer 330 to write data to the identified RU 324.

As shown in FIG. 3, multiple RGs are defined. For example, the RG system 300 includes a first RG 340 and a second RG 342. The first RG 340 includes a first group of RUs 350. The second RG 342 includes a second group of RUs 352. In some cases, the first RG 340 can represent a single memory die and the second RG 342 represents another single memory die. Each RU in the first group of RUs 350 is implemented by a portion of the memory components 112A to 112N, such as blocks, planes, super-blocks, pages, and so forth. Similarly, each RU in the second group of RUs 350 is implemented by a different portion of the memory components 112A to 112N, such as blocks, planes, superblocks, pages, and so forth. All of the garbage collection operations performed within RUs of an individual RG are constrained to that individual RG. For example, garbage collection operations performed on an individual RU of the first group of RUs 350 fold data using only the RUs in the first group of RUs 350 and garbage collection operations performed on an individual RU of the second group of RUs 352 fold data using only the RUs in the second group of RUs 352.

Figure 4:
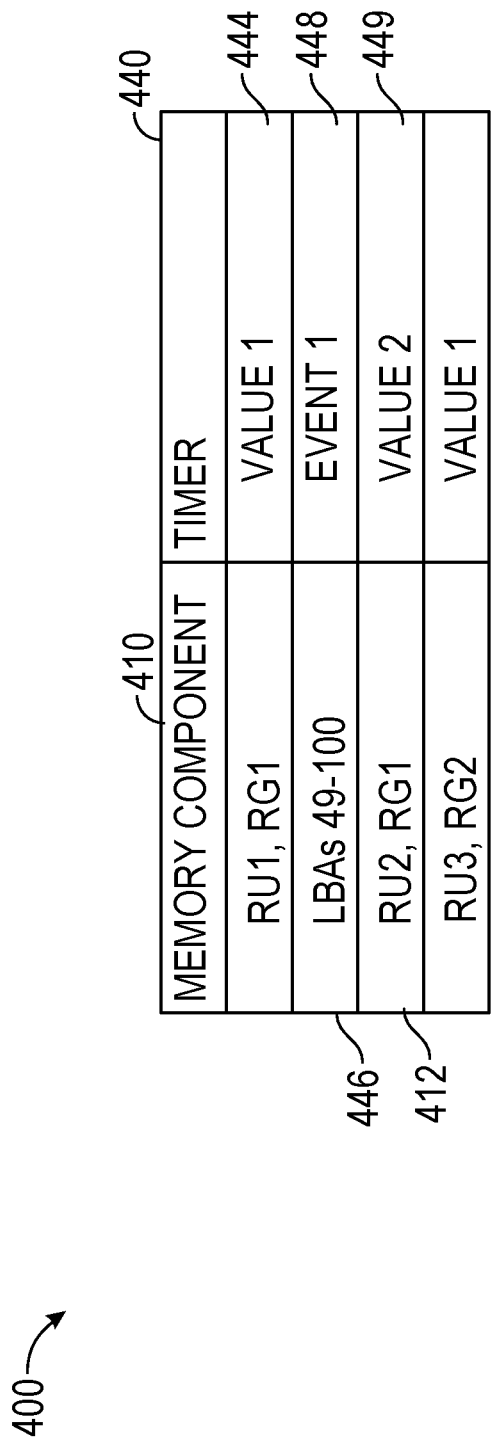
FIG. 4 is a block diagram of an example table of memory components subject to folding, in accordance with some implementations of the present disclosure.

Referring back to FIG. 2, the folding management component 230 can identify one or more memory components 112A to 112N that need to be folded. For example, the folding management component 230 can search the memory components 112A to 112N to determine whether one or more memory components 112A to 112N satisfy one or more folding criteria. The one or more folding criteria can include at least one of low free block count, static wear leveling, read disturb, and/or error handling. The folding management component 230 can, in some cases, select one or more RU for folding or garbage collection. In response, the folding management component 230 can store in a table 400 (shown in FIG. 4), each memory component 410 that is selected for folding. In some cases, the folding management component 230 can store an identifier 446 of LBAs that are subject to or selected for folding. The folding management component 230 can store an identifier 412 of one or more RUs and/or RGs that are subject to or selected for folding.

The folding management component 230 can also store, in association with each identifier for the memory component 410, a corresponding timer 440. The timer 440 can be configurable and can be used to control or delay folding of the data stored in the memory components 112A to 112N identified by the identifier of the memory component 410. The timer 440 can be of a specified amount, such as an individual value 444 (e.g., a specified threshold). Once the individual value 444 has transgressed (e.g., the timer has completely elapsed or reached the specified value), the corresponding data stored in the memory component identified by the memory component 410 can be folded (e.g., written to another RU or other portion of the memory components 112A to 112N). In some examples, once the timer 440 expires (reaches the specified value), the folding management component 230 determines whether the data stored in the corresponding memory components 112A to 112N still needs to be folded. The folding management component 230 can, as such, condition folding the data based on this determination. Different portions of the memory component 410 can be associated with different timer values. For example, the identifier 412 that corresponds to a first set of RUs can be associated with the timer value 449 while another set of RUs or another portion of the memory components 112A to 112N can be associated with the individual value 444 having a different timer value than the timer value 449.

In some examples, the timer 440 can be associated with a certain event 448, such a power-based event. Once the certain event 448 occurs, the corresponding data stored in the memory component identified by the memory component 410 can be folded (e.g., written to another RU or other portion of the memory components 112A to 112N).

For example, the host system 120 can generate an instruction to deallocate or invalidate the data stored in the memory components 112A to 112N associated with certain of the identifiers stored in the memory component 410. In such cases, the folding management component 230 can prevent or avoid folding the data stored in the memory components 112A to 112N associated with certain of the identifiers. If the host system 120 does not send the instruction to deallocate or invalidate the data before the timer expires or before the event stored in the timer 440 is reached, the folding management component 230 can continue to execute the instruction to fold the data.

In some examples, in response to adding an entry to the table 400, such as the identifier 446 and/or the identifier 412, the folding management component 230 can generate a communication for transmission to the host system 120 that includes or represents the entry added to the table 400. In some examples, the folding management component 230 transmits the communication in direct response to adding the entry to the table 400 such that the communication is transmitted asynchronously. In some cases, the host system 120 can query a log file stored by the folding management component 230 to retrieve the communication periodically. In either case, the host system 120 can identify one or more LBAs that are subject to being folded based on the communication received from the folding management component 230. The host system 120 can then determine which RU is being used to store the data and can determine whether the data is still needed. If the data is no longer needed, the host system 120 can generate an instruction to deallocate the data from the RU identified in the communication received from the folding management component 230. The host system 120 can send the instruction to deallocate the data before the timer associated with the RU expires to prevent the data from being folded. In some cases, the host system 120 can identify one or more LBAs in the communication received from the folding management component 230. The host system 120 can then pad the one or more LBAs with a plurality of adjacent LBAs to generate a region of the memory components 112A to 112N to deallocate. The host system 120 can transmit an instruction to deallocate the data stored in the region to prevent the data stored in the memory components 112A to 112N from being folded.

Figure 5:
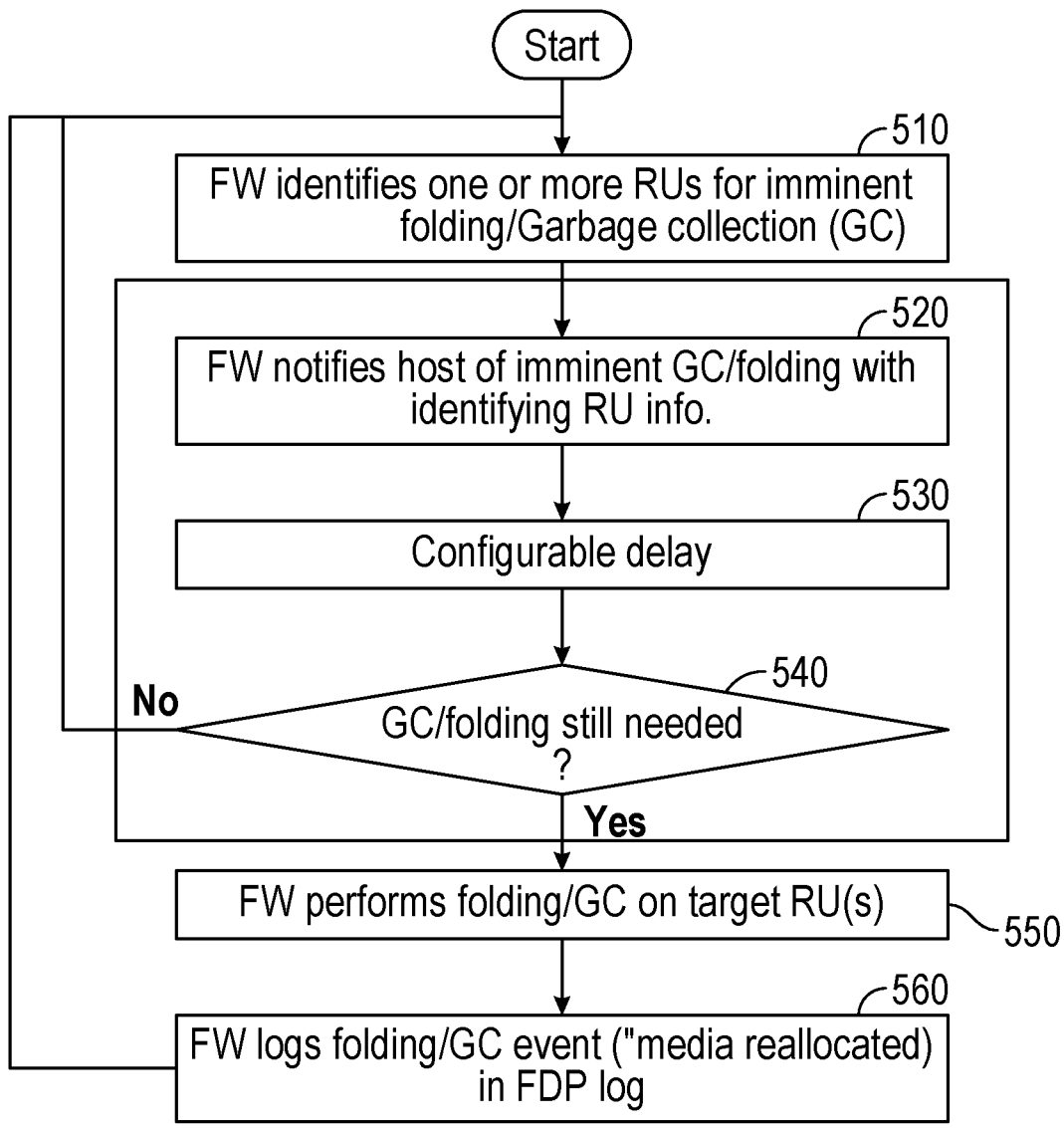
FIGS. 5 and 6 are flow diagrams of example methods to allow a host to participate in folding operations, in accordance with some implementations of the present disclosure.

FIG. 5 is a flow diagram of an example method 500 to allow a host to participate in folding operations, in accordance with some implementations of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 5, the method (or process) 500 begins at operation 510, with a media operations manager 122 of a memory sub-system (e.g., memory sub-system 110) identifying one or more RUs that need to be folded. Then, at operation 520, the media operations manager 122 notifies the host of the one or more RUs that need to be folded including one or more LBAs of the RUs in a communication asynchronously or synchronously (e.g., via a log file). The media operations manager 122, at operation 530, configures a delay for executing the folding operations for the data stored in the one or more RUs and, at operation 540, determines whether an instruction is received from the host in association with the data stored in the one or more RUs. Particularly, at operation 540, the media operations manager 122 determines whether folding operations are still needed for the data stored in the one or more RUs, such as based on whether the host deallocated or invalidated the data stored in the one or more RUs. At operation 550, the media operations manager 122 executes the instruction to fold the data stored in the one or more RUs, such as if the timer associated with the configurable delay expired prior to receiving an instruction from the host to deallocate or invalidate the data. Then, at operation 560, the media operations manager 122 logs the folding event in an FDP log.

Figure 6:
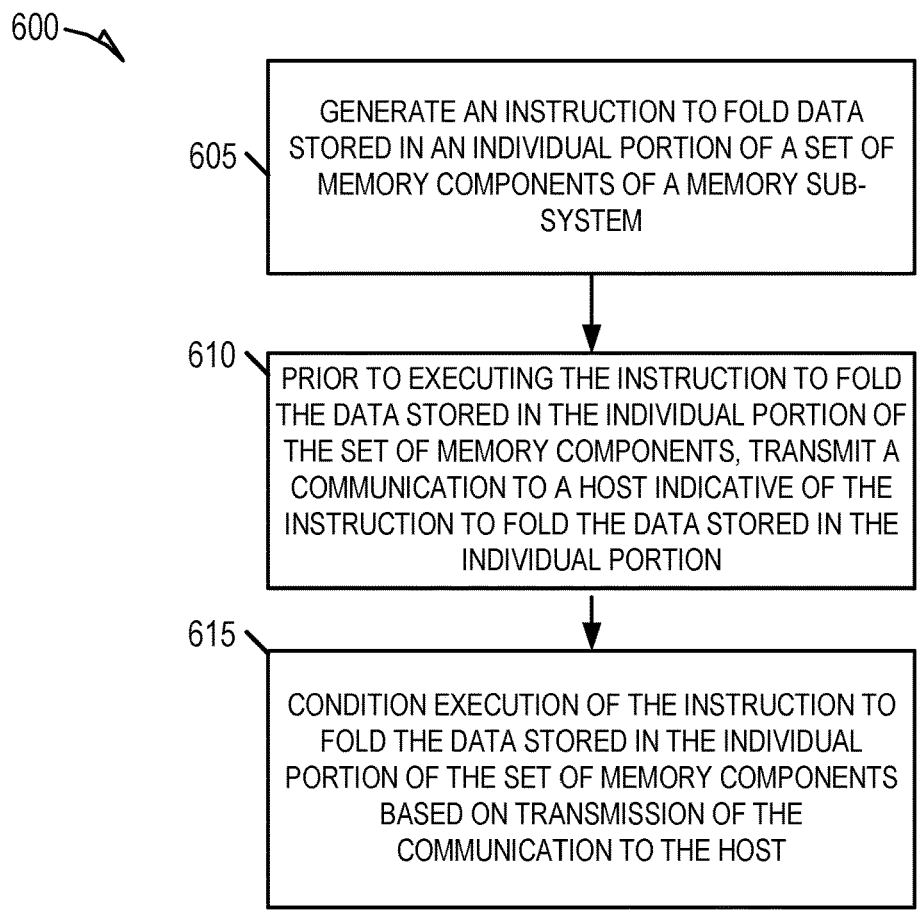

FIG. 6 is a flow diagram of an example method 600 to allow a host to participate in folding operations, in accordance with some implementations of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 600 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 6, the method (or process) 600 begins at operation 605, with a media operations manager 122 of a memory sub-system (e.g., memory sub-system 110) generating an instruction to fold data stored in an individual portion of a set of memory components. Then, at operation 610, the media operations manager 122, prior to executing the instruction to fold the data, transmits a communication to a host indicative of the instruction to fold the data. At operation 615, the media operations manager 122 conditions execution of the instruction to fold the data stored in the individual portion based on transmission of the communication to the host (e.g., based on whether the host deallocated the data prior to expiration of a timer or an event).

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: generating an instruction to fold data stored in an individual portion of the set of memory components; prior to executing the instruction to fold the data stored in the individual portion of the set of memory components, transmitting a communication to a host indicative of the instruction to fold the data stored in the individual portion; and conditioning execution of the instruction to fold the data stored in the individual portion of the set of memory components based on transmission of the communication to the host.

Example 2. The system of Example 1, wherein the memory sub-system includes Flexible Data Placement (FDP).

Example 3. The system of Example 2, the operations comprising: grouping the set of memory components into a plurality of reclaim groups (RGs), each RG of the plurality of RGs comprising a subset of reclaim units (RUS), the individual portion comprising an individual RU of the subset of RUs of an individual RG.

Example 4. The system of any one of Examples 1-3, the operations comprising: initializing a timer in response to transmitting the communication to the host; determining that the timer has reached a threshold value prior to receiving an instruction from the host in association with the individual portion; and automatically folding the data stored in the individual portion of the set of memory components in response to determining that the timer has reached the threshold value prior to receiving the instruction from the host in association with the individual portion.

Example 5. The system of Example 4, the operations comprising: preventing folding the data stored in the individual portion in response to receiving the instruction from the host prior to the timer reaching the threshold value.

Example 6. The system of Example 5, wherein the instruction comprises a request to deallocate or invalidate the data stored in the individual portion.

Example 7. The system of any one of Examples 4-6, wherein the timer is configurable.

Example 8. The system of any one of Examples 1-7, the operations comprising: receiving an instruction from the host to deallocate or invalidate the data stored in the individual portion; and preventing folding the data stored in the individual portion in response to receiving the instruction from the host.

Example 9. The system of any one of Examples 1-8, the operations comprising: identifying one or more logical block addresses (LBAs) associated with the data stored in the individual portion; and providing the identified one or more LBAs to the host in the communication.

Example 10. The system of Example 9, the operations comprising: identifying, by the host, a plurality of LBAs that include the one or more LBAs and an additional set of adjacent LBAs; and generating, by the host, an instruction to deallocate or invalidate data stored in the plurality of LBAs.

Example 11. The system of any one of Examples 1-10, wherein the communication is transmitted to the host asynchronously and in response to generating the instruction to fold data stored in an individual portion.

Example 12. The system of any one of Examples 1-11, wherein the communication is stored in a log file on the memory sub-system, the operations comprising: receiving a request from the host to read the log file; and retrieving the communication for transmission to the host in response to receiving the request from the host to read the log file.

Example 13. The system of any one of Examples 1-12, the operations comprising: grouping the set of memory components into a plurality of reclaim groups (RGs), each RG of the plurality of RGs comprising a subset of reclaim units (RUs), the individual portion comprising an individual RU of the subset of RUs of an individual RG; and folding the data stored in the individual RU to another RU of the individual RG.

Example 14. The system of Example 13, wherein the communication identifies the individual RU of the subset of RUs.

Example 15. The system of any one of Examples 1-14, wherein the instruction to fold the data is generated in response to determining that the individual portion satisfies one or more folding criteria.

Example 16. The system of Example 15, wherein the one or more folding criteria comprises at least one of low free block count, static wear leveling, read disturb, or error handling.

Methods and computer-readable storage medium with instructions for performing any one of the above Examples.

Figure 7:
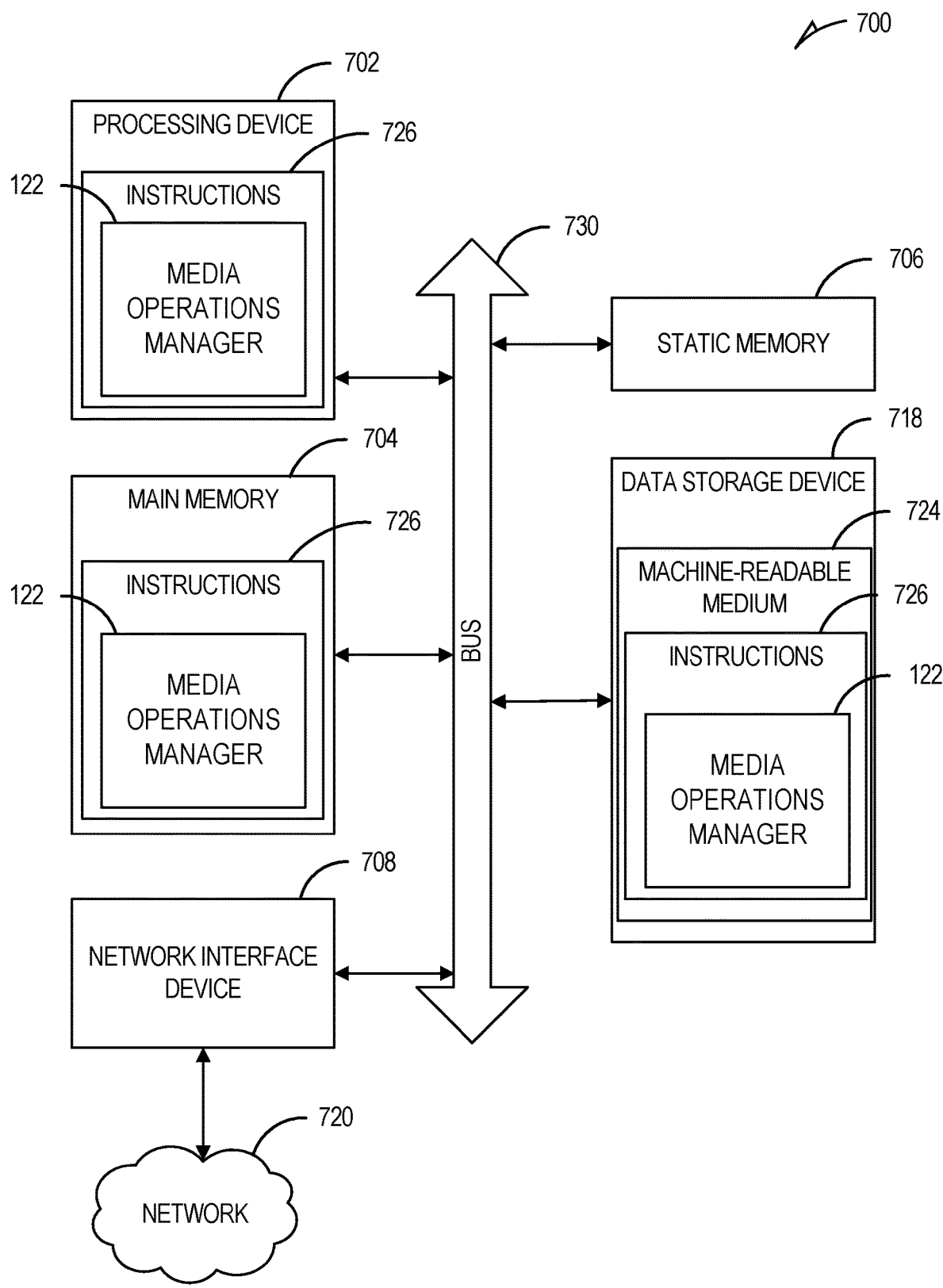
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 implement functionality corresponding to the media operations manager 122 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:
   a set of memory components of a memory sub-system; and
   at least one processing device operatively coupled to the set of memory components, the at least one processing device being configured to perform operations comprising:
      generating an instruction to fold data stored in an individual portion of the set of memory components;
      prior to executing the instruction to fold the data stored in the individual portion of the set of memory components, transmitting a communication to a host indicative of the instruction to fold the data stored in the individual portion; and
      conditioning execution of the instruction to fold the data stored in the individual portion of the set of memory components based on transmission of the communication to the host.

2. The system of claim 1, wherein the memory sub-system includes Flexible Data Placement (FDP).

3. The system of claim 2, the operations comprising:
   grouping the set of memory components into a plurality of reclaim groups (RGs), each RG of the plurality of RGs comprising a subset of reclaim units (RUs), the individual portion comprising an individual RU of the subset of RUs of an individual RG.

4. The system of claim 1, the operations comprising:
initializing a timer in response to transmitting the communication to the host;
determining that the timer has reached a threshold value prior to receiving an instruction from the host in association with the individual portion; and
automatically folding the data stored in the individual portion of the set of memory components in response to determining that the timer has reached the threshold value prior to receiving the instruction from the host in association with the individual portion.

5. The system of claim 4, the operations comprising:
preventing folding the data stored in the individual portion in response to receiving the instruction from the host prior to the timer reaching the threshold value.

6. The system of claim 5, wherein the instruction comprises a request to deallocate or invalidate the data stored in the individual portion.

7. The system of claim 4, wherein the timer is configurable.

8. The system of claim 1, the operations comprising:
receiving an instruction from the host to deallocate or invalidate the data stored in the individual portion; and
preventing folding the data stored in the individual portion in response to receiving the instruction from the host.

9. The system of claim 1, the operations comprising:
identifying one or more logical block addresses (LBAs) associated with the data stored in the individual portion; and
providing the identified one or more LBAs to the host in the communication.

10. The system of claim 9, the operations comprising:
identifying, by the host, a plurality of LBAs that include the one or more LBAs and an additional set of adjacent LBAs; and
generating, by the host, an instruction to deallocate or invalidate data stored in the plurality of LBAs.

11. The system of claim 1, wherein the communication is transmitted to the host asynchronously and in response to generating the instruction to fold data stored in an individual portion.

12. The system of claim 1, wherein the communication is stored in a log file on the memory sub-system, the operations comprising:
receiving a request from the host to read the log file; and
retrieving the communication for transmission to the host in response to receiving the request from the host to read the log file.

13. The system of claim 1, the operations comprising:
grouping the set of memory components into a plurality of reclaim groups (RGs), each RG of the plurality of RGs comprising a subset of reclaim units (RUs), the individual portion comprising an individual RU of the subset of RUs of an individual RG; and
folding the data stored in the individual RU to another RU of the individual RG.

14. The system of claim 13, wherein the communication identifies the individual RU of the subset of RUs.

15. The system of claim 1, wherein the instruction to fold the data is generated in response to determining that the individual portion satisfies one or more folding criteria.

16. The system of claim 15, wherein the one or more folding criteria comprises at least one of low free block count, static wear leveling, read disturb, or error handling.

17. A method comprising:
generating an instruction to fold data stored in an individual portion of a set of memory components of a memory sub-system;
prior to executing the instruction to fold the data stored in the individual portion of the set of memory components, transmitting a communication to a host indicative of the instruction to fold the data stored in the individual portion; and
conditioning execution of the instruction to fold the data stored in the individual portion of the set of memory components based on transmission of the communication to the host.

18. The method of claim 17, wherein the memory sub-system includes Flexible Data Placement (FDP).

19. The method of claim 18, further comprising:
grouping the set of memory components into a plurality of reclaim groups (RGs), each RG of the plurality of RGs comprising a subset of reclaim units (RUs), the individual portion comprising an individual RU of the subset of RUs of an individual RG.

20. A non-transitory computer-readable storage medium comprising instructions that, when executed by at least one processing device, cause the at least one processing device to perform operations comprising:
generating an instruction to fold data stored in an individual portion of a set of memory components of a memory sub-system;
prior to executing the instruction to fold the data stored in the individual portion of the set of memory components, transmitting a communication to a host indicative of the instruction to fold the data stored in the individual portion; and
conditioning execution of the instruction to fold the data stored in the individual portion of the set of memory components based on transmission of the communication to the host.

* * * * *